UNITED STATES PATENT OFFICE.

GEORGE B. BRADSHAW, OF STAMFORD, CONNECTICUT.

PROCESS OF PRODUCING PHENOLS.

1,398,998.   Specification of Letters Patent.   Patented Dec. 6, 1921.

No Drawing.   Application filed October 23, 1917. Serial No. 198,147.

*To all whom it may concern:*

Be it known that I, GEORGE B. BRADSHAW, a citizen of the United States of America, residing at Stamford, in the county of Fairfield and State of Connecticut, have invented certain new and useful Improvements in Processes for Producing Phenols, of which the following is a specification.

This invention relates to a process for producing phenols and in its more intense aspect to a process for producing dinitrophenol of a high degree of purity from dinitrochlorbenzol. Broadly speaking, this process consists in treating dinitrochlorbenzol with caustic lime and obtaining the dinitrophenol from the calcium salts thereof, first making the calcium salts soluble and then decomposing them.

One of the objects of the present invention is to provide a simple and practical process of the above general character which may be easily, quickly and inexpensively carried out with a minimum amount of apparatus. Other objects will be in part obvious and in part hereinafter pointed out.

The present invention accordingly consists in such steps and the relation of each step to each of the other steps, as will be hereinafter set forth in the following disclosure and more particularly recited in the appended claims.

Usually the process is carried out by treatment of dinitrochlorbenzol with soda producing soluble sodium dinitrophenolate which can be readily filtered and decomposed by treating with acid to precipitate the dinitrophenol. This process, however, has certain objections such as, first, the expense of the soda, second, the decomposition must be carried out under very exact and difficult conditions or a dark colored product is obtained, and third, the dinitrophenol obtained is in very fine condition and dries to the very lightest powder, thereby making it exceedingly difficult for workmen to handle because of its poisonous character.

If calcium hydrate is used to perform the hydrolysis from dinitrochlorbenzol to dinitrophenol, there are usually formed both soluble and insoluble calcium salts of dinitrophenol. So far as heretofore known, there is no practicable way to purify these substances. I have discovered, however, that the addition of a very small amount of a suitable acid, for instance, hydrochloric acid, causes all the calcium salts to become soluble. The batch can then be filtered and when the thus purified material is decomposed, either hot or cold, with hydrochloric acid there is precipitated a dinitrophenol having granular large sized crystals. The dinitrophenol thus produced washes very easily in a centrifuge and when dried is dense and not a fluffy powder.

I prefer to carry out the present process by charging into a steam jacketed autoclave provided with a stirrer, materials in substantially the following proportions:

Dinitrochlorbenzol _____ 5 parts.
Caustic lime _____ 1¾ parts.
Water _____ 100 parts.

The temperature is gradually raised until there is about ten pounds pressure in the autoclave. After three hours, the conversion is usually complete. This may be easily determined by testing. The batch is then run into a tank and just enough hydrochloric acid added to make the calcium salts of dinitrophenol soluble, that is, about one-tenth to one-half of one part, (when used with the above proportions). The batch is then filtered or mechanically separated as by settling and decanting, for example, and more hydrochloric acid added until all of the calcium salt of dinitrophenol is decomposed. The precipitate is then washed and dried.

It is thus seen that the present invention contemplates a simple and practical process requiring a minimum amount of apparatus and material and which may be easily, quickly and inexpensively performed.

Without further analysis, the foregoing will so fully reveal the gist of this invention that others can by applying current knowledge readily adapt it for various applications without omitting certain features that, from the standpoint of the prior art, fairly constitute essential characteristics of the generic or specific aspects of this invention, and therefore such adaptations should and are intended to be comprehended within the meaning and range of equivalency of the following claims.

I claim:

1. In the process of producing phenols by means of their calcium salts, acidifying an aqueous mixture containing said calcium salts to a point of complete solubility thereof.

2. In the process of producing dinitrophenol by means of its calcium salts, acidifying an aqueous mixture containing said calcium salt to the point of complete solubility thereof.

3. In the process of producing phenols, forming the calcium salts thereof in aqueous mixture, acidifying said mixture to the point of complete solubility of said calcium salts, and filtering and precipitating the phenol from the filtered solution.

4. In the process of producing dinitrophenol, forming the calcium salt thereof in an aqueous mixture, adding hydrochloric acid to said mixture to the point of completely dissolving said salt, filtering and precipitating dinitrophenol from the filtered solution.

5. In the process of producing phenols, forming the calcium salts thereof in aqueous mixture, adding hydrochloric acid to said mixture until the calcium salts are completely dissolved, filtering, and decomposing the filtered solution by adding hydrochloric acid thereto to precipitate the phenol.

6. The process of producing dinitrophenol from dinitrochlorbenzol which consists in mixing substantially five parts of dinitrochlorbenzol with one and three fourths parts of caustic lime in the presence of one hundred parts of water, heating the mixture to effect complete reaction, and acidifying the resulting aqueous mixture to the point of complete solubility of calcium salts formed.

7. The process of producing dinitrophenol from dinitrochlorbenzol which consists in mixing substantially five parts of dinitrochlorbenzol with about one and three-fourths parts of caustic lime in the presence of one hundred parts of water, heating the mixture to effect complete reaction, acidifying the resulting aqueous mixture to the point of complete solubility of calcium salts formed, filtering and precipitating the dinitrophenol from the filtered solution.

8. The process of producing dinitrophenol from dinitrochlorbenzol which consists in mixing substantially five parts of dinitrochlorbenzol with about one and three-fourths parts of caustic lime in the presence of one hundred parts of water, heating the mixture to effect complete reaction, acidifying the resulting aqueous mixture to the point of complete solubility of calcium salts formed, with about $\frac{1}{10}$th part of hydrochloric acid, filtering and precipitating the dinitrophenol from the filtered solution.

In testimony whereof I affix my signature in the presence of a witness.

GEORGE B. BRADSHAW.

Witness:
P. A. BLAIR.